(12) United States Patent
Littau et al.

(10) Patent No.: US 10,309,466 B2
(45) Date of Patent: Jun. 4, 2019

(54) PROTECTIVE DEVICE FOR A UNIVERSAL SHAFT AS WELL AS PROTECTIVE ARRANGEMENT WITH UNIVERSAL SHAFT AND SUCH A PROTECTIVE DEVICE

(71) Applicant: GKN Walterscheid GmbH, Lohmar (DE)

(72) Inventors: Matthias Littau, Alfter (DE); Martin Hector, Siegburg (DE); Wolfgang Adamek, Lohmar (DE)

(73) Assignee: GKN Walterscheid GmbH, Lohmar (DE)

( * ) Notice: Subject to any disclaimer, the term of this patent is extended or adjusted under 35 U.S.C. 154(b) by 244 days.

(21) Appl. No.: 15/428,454

(22) Filed: Feb. 9, 2017

(65) Prior Publication Data
US 2017/0227062 A1   Aug. 10, 2017

(30) Foreign Application Priority Data

Feb. 10, 2016 (EP) .................................. 16155046

(51) Int. Cl.
*F16D 3/84*   (2006.01)
*F16B 2/20*   (2006.01)

(52) U.S. Cl.
CPC ............ *F16D 3/841* (2013.01); *F16B 2/20* (2013.01); *F16D 2250/0061* (2013.01); *Y10S 292/11* (2013.01)

(58) Field of Classification Search
CPC ... F16D 3/841; F16D 3/84; F16B 2/20; Y10S 292/11

USPC ................................... 464/174, 176; 292/113
See application file for complete search history.

(56) References Cited

U.S. PATENT DOCUMENTS

| | | | |
|---|---|---|---|
| 6,203,440 B1* | 3/2001 | Bondioli | A01B 71/08 |
| 7,204,458 B2* | 4/2007 | Porte | B64D 29/06 |
| | | | 292/113 |
| 9,915,294 B2* | 3/2018 | Littau | F16D 3/841 |

FOREIGN PATENT DOCUMENTS

| | | | | |
|---|---|---|---|---|
| DE | 532 052 | * | 8/1931 | ................... 464/177 |
| DE | 196 29 998 | | 3/1998 | |
| EP | 0 086 606 | | 8/1983 | |
| EP | 0 918 951 | | 9/2002 | |
| GB | 2480523 | | 11/2011 | |

* cited by examiner

*Primary Examiner* — Greg Binda
(74) *Attorney, Agent, or Firm* — Bejin Bieneman PLC

(57) ABSTRACT

A protective device for a universal shaft (3) has an attachment element (6), a tubular protective guard (7) and a latching device (24, 25). The attachment (6) is positioned around a shaft journal (2) projecting from a housing (1) and is attached to said housing (1). The tubular protective guard (7) extends along a longitudinal axis L and is positioned around a universal shaft (3) connected to the shaft journal (2). The latching device has at least one latching element (24) and at least one latching projection (25). The latching element (24) is arranged on either the attachment element (6) or the protective guard. The latching projection (25) is arranged on either the protective guard (7) or the attachment element (6). The latching element (24) is displaceable between a latched position and a release position. The latching element (24) is elastically formed and engages, in the latched position, behind the latching projection (25).

20 Claims, 3 Drawing Sheets

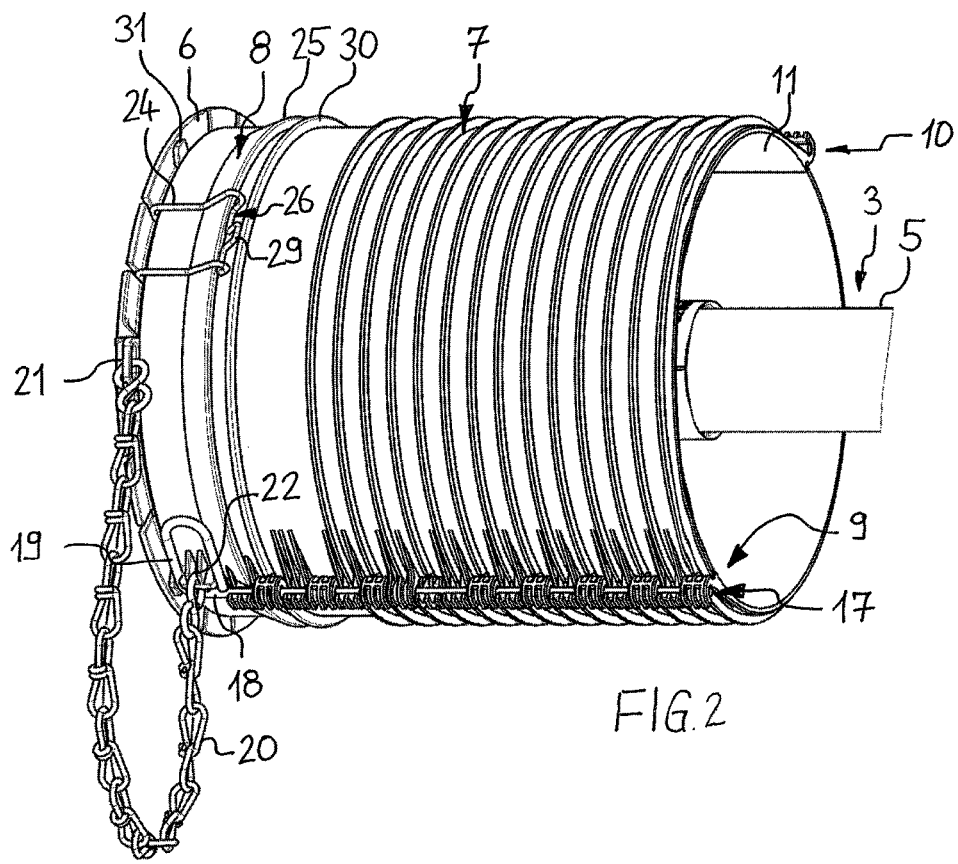
FIG. 2
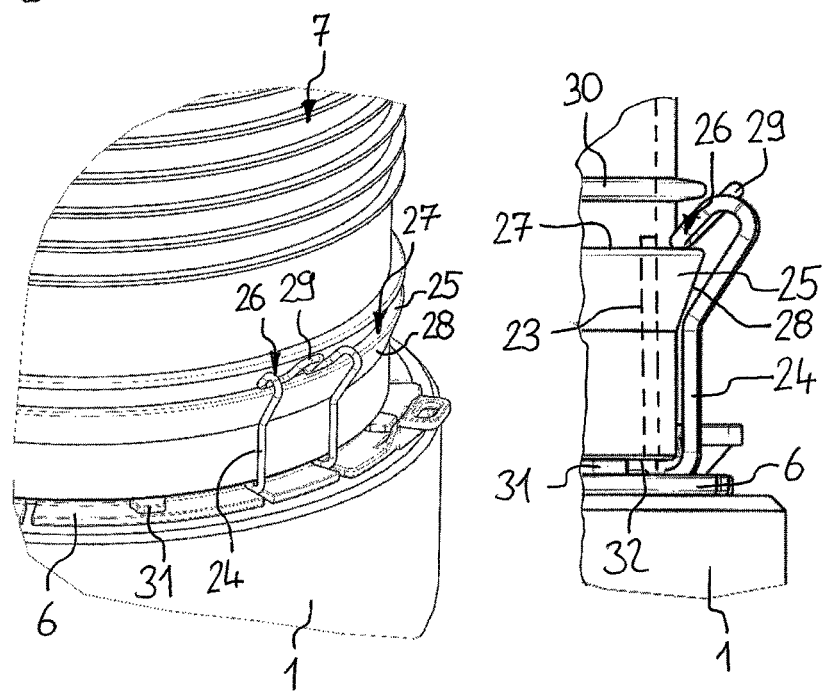
FIG. 3
FIG. 4

PROTECTIVE DEVICE FOR A UNIVERSAL SHAFT AS WELL AS PROTECTIVE ARRANGEMENT WITH UNIVERSAL SHAFT AND SUCH A PROTECTIVE DEVICE

CROSS-REFERENCE TO RELATED APPLICATION

This application claims priority to European Patent Application No. 16155046.2, filed Feb. 10, 2016. The entire disclosure of the above application is incorporated herein by reference.

FIELD

The disclosure relates to a protective device for a universal shaft with an attachment element, a tubular protective guard and a latching device. The attachment element is positionable around a shaft journal projecting from a housing and is attachable to the housing. The protective guard extends along a longitudinal axis and is positionable around a universal shaft connected to the shaft journal. The latching device attaches the protective guard to the attachment element.

BACKGROUND

A protective device is known from EP 0 918 951 B1. The protective device has a disc that can be attached to a gearbox housing. A shaft journal projects from the stationary gearbox housing. A universal shaft with a protective cover can be connected to the shaft journal. The protective device has a sleeve that is tubular and is formed as a closed uniform piece across the circumference. The sleeve is engaged in an inner edge of the disc and clamped via clamping clips to the edge and can also be released therefrom. The universal shaft is passed through the sleeve.

SUMMARY

It is an object of the present disclosure to provide a protective device of the above named type where the protective guard can be mounted in a simple manner.

The object is met by a protective device for a universal shaft where the protective device comprises an attachment element, a tubular guard and a latching device. The attachment element is positioned around a shaft journal projecting from a housing and is attached to the housing. The tubular protective guard extends along a longitudinal axis and is positioned around a universal shaft connected to the shaft journal. The latching device attaches the protective guard to the attachment element. The latching device has at least one latching element and at least one latching projection. The latching element is arranged on the attachment element. The latching projection is arranged on the protective guard. Alternatively, the latching element is arranged on the protective guard and the latching projection is arranged on the attachment element. The latching element is displaceable between a latched position and a releasing portion. The latching element is elastic formed for taking-up the latched position and in the latched position engages behind the latching projection.

The latching device has a latching connection so that no clamping means, which have to be attached for fixing the protective guard, is provided. Because of the elastically formed latching elements, the protective guard can lock itself when being pushed onto the attachment element.

The protective guard can be locked on the attachment element without having to actuate the latching element manually. The latching projection has a setting face that interacts, during the assembly of the protective guard in axial direction onto the attachment element, with the latching element. Thus, the latching element is transferred into the release position.

The latching element can be elastically radially displaced until the latching element passes the latching projection. The latching element elastically returns, in a latching manner, behind the latching projection. In this case, the latching element can itself be formed as an elastic element or can be acted upon by a force by a separate spring element.

In an embodiment the attachment element has a support collar. The protective guard is radially supported by the support collar. Thus, the radial position of the protective guard is predetermined. The support collar can be formed as a collar extending circumferentially, without interruptions, around the longitudinal axis. The support collar can, however, also be formed with interruptions. Thus, individual support elements result that are arranged in a distributed manner around the circumference.

According to an embodiment, in the latched position of the latching element, the smallest distance of the latching element to the support collar is smaller than the largest distance of the latching projection to the support collar. Thus, this ensures that in the latched position of the latching element, when seen in radial direction, the latching projection and the latching element overlap each other. Thus, the latching element engages behind the latching projection.

The setting face can be formed in an axial direction with an increasing distance to the support collar. The latching projection has a latching face where the latching element is axially supported in the latching position, when the protective guard is completely mounted.

The latching element can have engagement faces for a tool. Thus, in the mounted condition of the protective guard, the latching element can be displaced by a tool from the latched position into the release position. Preferably, the latching element can only be displaced by means of a tool. This prevents an unintentional manual releasing of the protective guard from the attachment element.

In an embodiment of the protective device, a return element can be axially supported between the attachment element and the protective guard. The return element acts on the protective guard with a force away from the attachment element. This means, that during the assembly of the protective guard on the attachment element, initially the protective guard has to be pushed against a force of the return element onto the support collar of the attachment element. As soon as the protective guard is retained, via the latching element and the latching projection in a latched manner on the attachment element, the protective guard remains mounted on the attachment element. The protective guard remains, however, acted on by a pre-biasing force in a direction away from the attachment element. Thus, a possible axial clearance between the attachment element and the protective guard is pushed out. The protective guard is moved automatically by the return element axially away from the attachment element as soon as the latching element is transferred into the release position. Thus, the disassembly of the protective guard is facilitated.

The at least one latching element can be attached on the attachment element and the latching projection on the protective guard. Alternatively, the latching element can be attached on the protective guard and the latching projection can be arranged on the attachment element. The protective guard can be arranged externally around the support collar. Thus, the latching element can be arranged in a radial direction externally of the protective guard and is easily operable. Alternatively, the protective guard and the support collar can also be formed so that the protective guard is pushed into the support collar. That is, it is arranged within the support collar. In this case, the latching projection can extend along a portion of the circumference of the protective guard or along the entire circumference of the protective guard.

The object of the disclosure is met by a protective arrangement comprising a universal shaft and a protective device as described above. The universal shaft is connected in a drive-wise manner to a shaft journal projecting from a housing. The attachment element of the protective device is, in this case, positionable around the shaft journal and attached on the housing. The protective guard of the protective device is arranged to partially enclose the universal shaft as well as the universal shaft protection element. Thus, this ensures that a gap between the universal shaft protection element and the housing is covered by the protective guard.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a perspective view of the protective device of FIG. 1 with a mounted protective guard.

FIG. 3 is an enlarged perspective view of the locking unit of the protective device of FIGS. 1 and 2.

FIG. 4 is a side view of the locking unit of FIG. 3.

DETAILED DESCRIPTION

Example embodiments will now be described more fully with reference to the accompanying drawings.

Figure 1:
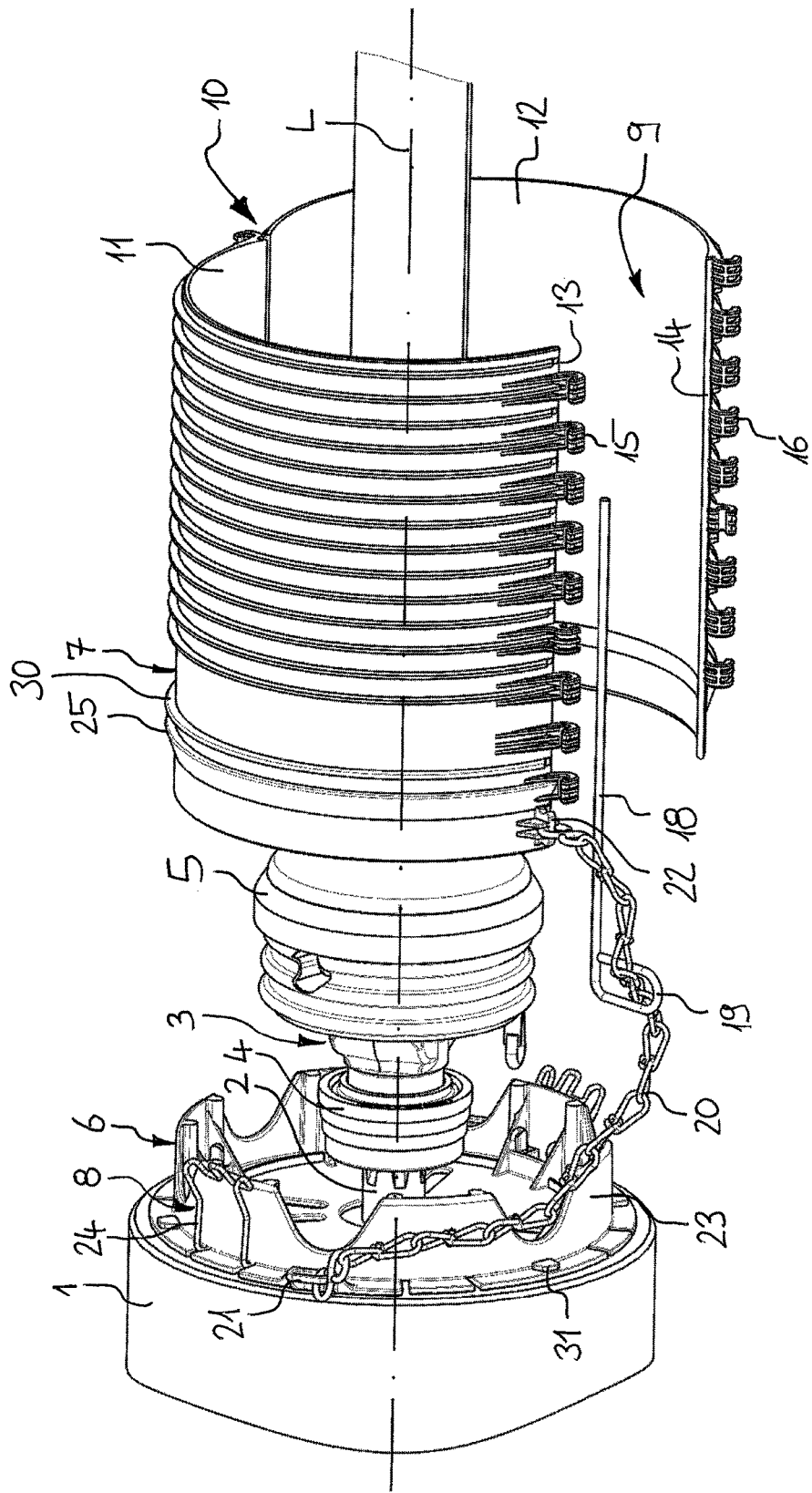
FIG. 1 is a perspective exploded view of a protective device for protecting a universal shaft according to the disclosure.

FIGS. 1 and 2 show the protective device in different views and are described in the following together.

The protective device is attached on a housing 1, for example of a gearbox, with a projecting shaft journal 2 that is driven or can be driven around a longitudinal axis L. In this case, it can for example be the input shaft of a gearbox of a to be driven agricultural implement.

A universal shaft 3 is drivingly connected to the shaft journal 2. The universal shaft 3 is rotatable together with the shaft journal 2 around the longitudinal axis L. A fastener 4 detachably locks the universal shaft 3 to the shaft journal 2. A common shaft toothing serves for torque transmission.

A universal shaft protection element 5 is supported on the universal shaft 3 and accommodates the same. The universal shaft protection element 5 is stationary held relative to the stationary component, for example the housing 1 or a different housing. A chain (not shown) is connected to the stationary component and to the universal shaft protection element 5. The chain prevents the universal shaft protection element 5 from rotating with the universal shaft 3.

An axial portion between the gearbox housing 1 and the end of the universal shaft protection element 5 is not protected. To cover this portion, the protective device according to the disclosure is provided. The protective device includes an attachment element 6 and a protective guard 7. The attachment element 6 is fixed on the housing 1. A latching device 8 detachably connects the protective guard 7 to the attachment element 6. The protective guard 7 can be opened (FIG. 1), as described in the following in more detail, to be arranged around the universal shaft 3. In the closed condition (FIG. 2) the protective guard 7 is tubular and is arranged coaxially to the longitudinal axis L. In the closed condition, it is locked to the attachment element 6. In this case, the protective guard 7 covers the area of the universal shaft 3 between the housing 1 and the end of the universal shaft protection element 5 facing the housing 1.

The protective guard 7 has a first joining line 9 and a second joining line 10. The joining lines 9, 10 extend parallel to the longitudinal axis L. The joining lines 9, 10 separate the protective guard 7 into a first shell element 11 and a second shell element 12. The joining lines 9, 10 are in the present case identically formed. The two shell elements 11, 12 can be identically formed. This prevents the need to provide different tools for the manufacture of the first shell element 11 and of the second shell element 12. Thus, this reduces the diversity of the protective device. In the following, the first joining line 9 is described in more detail.

Figure 5:
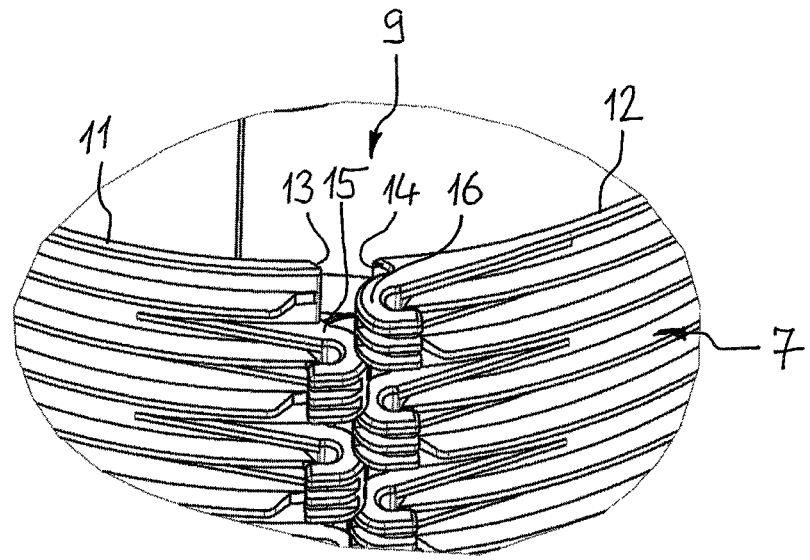
FIG. 5 is a perspective view of the locking mechanism at one of the jointing lines in the opened condition.
Figure 6:
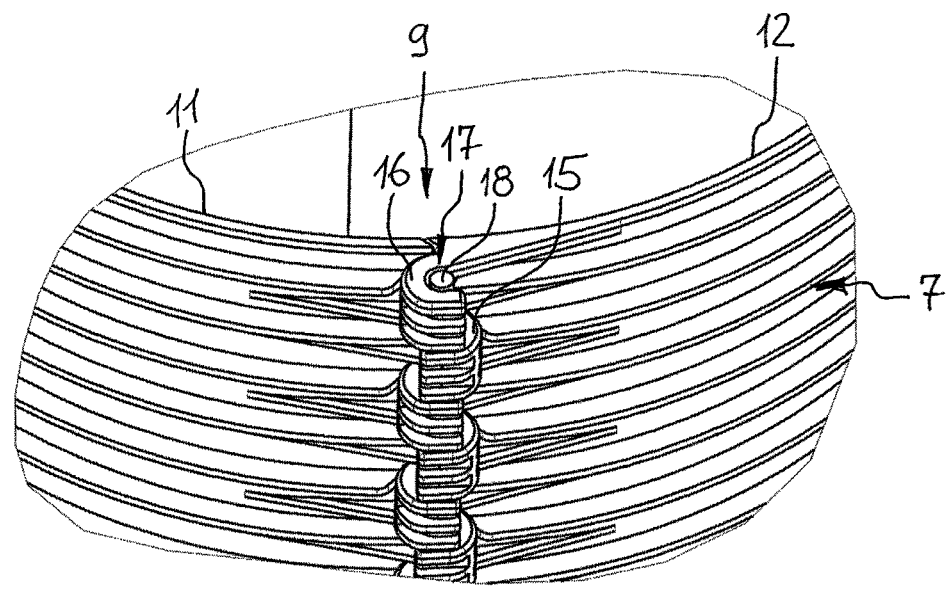
FIG. 6 is a perspective view of the locking mechanism of FIG. 5 in the locked condition.

The first joining line 9 is formed by a longitudinal edge 13 of the first shell element 11 and a longitudinal edge 14 of the second shell element 12. The two longitudinal edges 13, 14 abut each other. They are connected to each other in the closed condition of the protective guard 7 (FIG. 2). A closure mechanism connects the longitudinal edges 13, 14. The closure mechanism has form fitting latching elements in the form of hooks 15, provided on the longitudinal edge 13 of the first shell element 11, and hooks 16, along the longitudinal edge 14 of the second shell element 12. The hooks 15, 16 of the two longitudinal edges 13, 14 are, respectively, opened in a direction away from the respective other longitudinal edge 13, 14. The hooks 15 of the longitudinal edge 13 of the first shell element 11 engage in axial gaps between the hooks 16 along the longitudinal edge 14 of the second shell element 12. When the protective guard 7 is in its closed position, as it can be seen in FIGS. 5 and 6. In the closed condition (FIGS. 2 and 6) the hooks 15, 16 form a connection channel 17. The connection channel 17 extends parallel to the longitudinal axis L.

A connection pin 18 is axially pushed into the connection channel 17. The hooks 15, 16, when trying to move the two shell elements 11, 12 away from each other, are supported on the connection pin 18 in a circumferential direction. Accordingly, opening of the shell elements 11, 12 is prevented. The connection pin 18 has a head portion to prevent it from being pushed too far in one direction through the connection channel 17. The head portion increases relative to the diameter of the connection channel 17 in the form of an eyelet 19. The eyelet 19 is positioned at the end of the connection channel 17 facing the attachment element 6 or on the end of the protective guard 7 facing the attachment element 6. The attachment element 6 is in an axial direction and is in an overlapping manner to the connection pin 18 or the eyelet 19. Thus, the connection pin 18 abuts, when trying to move it out of the connection channel 17, against the attachment element 6. At the same time, the connection pin 18 has not completely left the connection channel 17. Thus, in the mounted condition of FIG. 2, the connection pin 18 is prevented from unintentionally being pulled out of the connection channel 17 or moving out of the connection channel 17 due to vibration.

The second joining line 10 can be identically formed. An identical connection pin 18 is provided. The second joining line 10 also may differ from the first joining line 9 in that a modified connection pin is provided. The pin has, for example, no eyelet 19. Both ends of the pin have an increased portion. By deforming the connection pin 18, the protective guard 7 cannot be opened at the second joining lines 10. The pin 18 only serves as a hinge. Insofar as the two joining lines 9, 10 are identically formed, identical connection pins 18, as shown at the first joining line 9, can serve as hinges and both joining lines 9, 10 can serve as a closure mechanism. Thus, the protective guard 7 can be opened.

To mount the protective guard 7, only the connection pin 18 can be pulled out of the connection channel 17 of the first joining line 9. Thus, the two shell elements 11, 12 can be hinged around the second joining line 10 and the protective guard 7 opened. The protective guard 7 can then, as visible in FIG. 1, be positioned in a radial direction to the longitudinal axis L around the universal shaft 3. As soon as the opened protective guard 7 is in this position, the shell elements 11, 12 can be moved towards each other. The joining line 9 is closed. The connection pin 18 is pushed into the connection channel 17. Thus, the protective guard 7 is closed and cannot be opened.

To offer securing against loss, a securing element, in the form of a chain 20, is provided. The chain 20 is attached at one end at a securing eyelet 21 of the attachment element 6. The other end is attached at a securing eyelet 22 of the first shell element 11. The chain 20 is passed through the eyelet 19 of the connection pin 18. Thus, in the opened condition of the protective guard 7, as shown in FIG. 1, the protective guard 7 as well as the connection pin 18 are securely held against loss relative to the attachment element 6. Alternatively the chain 20 can also be fixed to a chain link on the connection pin 18. Instead of a chain, a rope or a wire can also be used.

As soon as the protective guard 7 is closed, it can be pushed in an axial direction of the longitudinal axis L onto the attachment element 6. The protective guard is retained by means of the latching device 8 on the attachment element 6.

The attachment element 6 has a support collar 23 arranged coaxially to the longitudinal axis L. The protective guard 7 can be pushed onto the support collar 23. Alternatively, it is also possible, that the support collar 23 is formed so that the protective guard 7 is pushed into the support collar 23. The support collar 23 serves to radially support the protective guard 7.

The latching device 8 includes two latching elements 24 arranged diametrically opposite to one another. One is representatively described. Generally it is also possible, to assign three or more latching elements. The latching device 8 has a latching projection 25. In the present embodiment, the latching element 24 is arranged on the attachment element 6. The latching projection 25 is arranged on the protective guard 7. Generally, these elements can however also be arranged vice versa. The latching projection 25 can be arranged on the attachment element 6 and the latching element 24 can be arranged on the protective guard 7.

The latching element 24 is a spring element in the form of a spring clip. The latching element 24 is, thus, elastically formed. It can be displaced from the latched position, shown in FIG. 4, into a release position, bent radially outwards. It is also possible, that the latching element 24 has a separate spring, that elastically moves a rigid element.

In the latched position, the latching element 24 is supported by a latching portion 26 axially on a latching face 27 of the latching projection 25. The latching projection 25 is formed as a circumferentially extending projection along the entire circumference of the protective guard 7. The latching face 27 is arranged vertically to the longitudinal axis L. The latching face 27 faces away from the housing 1. Thus, the protective guard 7 is locked on the attachment element 6.

The protective guard 7 can be pushed onto the support collar 23 to automatically latch the protective guard 7. The latching projection 25 has a setting face 28, which during assembly of the protective guard 7 in axial direction, interacts with the latching element 24. The latching element 24 is transferred into its release position by being pushed radially outwards. The setting face 28 extends in an axial direction with an increasing distance from the support collar 23. This is indicated in FIG. 4 in dashed lines. The latching projection 25 is cone-shaped in the area of the setting face 28. The setting face 28, which represents the outer face of the cone, expands in a direction away from the attachment element 6 or away from the housing 1. Thus, the setting face 28 pushes, during the movement of the protective guard 7 in a direction to the housing 1, the latching element 24 radially outwards. This occurs until the latching portion 26 engages behind the latching projection 25 and is axially supported on the latching face 27. That is, as shown in FIG. 4, when the latching portion 26 is supported on the latching face 27 of the latching projection 25, at least a portion of the latching element 24 is between the support collar 23 and the latching projection 25, i.e., the smallest distance of the latching element 24 to the support collar 23 is smaller than the largest distance of the latching projection 25 to the support collar 23.

The latching portion 26 of the latching element 24 is, in this case, also inclined to the longitudinal axis L. A front edge 32 of the protective guard 7 can be supported for a better feeding of the protective guard 7 onto the latching portion 26. The latching element 24 also moves a bit radially outwards.

To detach the protective guard 7 from the attachment element 6, the latching elements 24 can be pushed radially outwards. The latching elements 24 have, respectively, recesses 29 as engagement means for a tool. A screw driver serves, for example, as a tool. The tool is supported on the recess 29 and on a collar 30 or on the setting face 28 on the protective guard 7. Thus, the latching element 24 can be levered radially outwards away from the protective guard 7. In this case, it is especially advantageous, that the screw driver can be applied approximately parallel to the longitudinal axis L. The tool does not have to be applied in radial direction. Thus, a detaching of the protective guard 7 is also possible under tight conditions.

To enable a simpler detaching of the protective guard 7 from the attachment element 6, return elements in the form of rubber buffers 31, are provided on the attachment element 6. In the mounted condition, the protective guard 7 is supported on the rubber buffers 31, which remain elastically biased. As soon as the latching elements 24 are transferred into their released position, the rubber buffers 31 push the protective guard 7 slightly axially away from the attachment element 6. The latching elements 24 do not again engage behind the latching face 27. The latching portion 26 comes into external abutment on the setting face 28 on the latching projection 25. Thus, a repeated unintentional locking is prevented.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A protective arrangement, comprising:
a housing with a shaft journal projecting from the housing;
a universal shaft connected to the shaft journal;
an attachment element positioned around the shaft journal and being attached to the housing;
a tubular protective guard extending along a longitudinal axis, the tubular protective guard including a first shell element and a second shell element positioned around the universal shaft, the first and second shell elements connected along respective longitudinal edges; and
a latching device attaching the protective guard to the attachment element;
wherein the latching device has at least one latching element and at least one latching projection;
wherein the latching element is arranged on the attachment element and the latching projection is arranged on the protective guard or the latching element is arranged on the protective guard and the latching projection is arranged on the attachment element;
wherein the latching element is displaceable between a latched position and a release position;
wherein the latching element is elastically formed and the latching element engages behind the latching projection in the latched position; and
wherein the latching projection has a setting face that interacts, during pushing the protective guard in an axial direction onto the attachment element, with the latching element so that the latching element is displaced into the release position.

2. The protective arrangement according to claim 1, wherein the attachment element has a support collar, and the protective guard is radially supported on the support collar.

3. The protective arrangement according to claim 2, wherein in the latched position of the latching element, the smallest distance of the latching element to the support collar is smaller than the largest distance of the latching projection to the support collar.

4. The protective arrangement according to claim 2, wherein the protective guard is arranged externally around the support collar.

5. The protective arrangement according to claim 1, wherein the setting face extends in an axial direction with increasing distance to the support collar and the latching projection has a latching face, on which the latching element is axially supported in the latched position.

6. The protective arrangement according to claim 1, wherein the latching element is formed as a spring element.

7. The protective arrangement according to claim 1, wherein the latching element has engagement faces for a tool.

8. The protective arrangement according to claim 1, wherein a return element is axially supported on the attachment element and on the protective guard and the return element biases the protective guard in a direction away from the attachment element.

9. The protective arrangement according to claim 1, wherein the latching element is attached on the attachment element.

10. The protective arrangement according to claim 1, wherein the latching projection extends at least partially along the circumference of the protective guard.

11. The protective arrangement of claim 1, wherein the first shell element is openable in a direction away from the second shell element.

12. A protective arrangement, comprising:
a housing with a shaft journal projecting from the housing;
a universal shaft connected to the shaft journal;
an attachment element positioned around the shaft journal and being attached to the housing;
a tubular protective guard extending along a longitudinal axis, the tubular protective guard including a first shell element and a second shell element positioned around the universal shaft, the first and second shell elements connected along respective longitudinal edges; and
a latching device attaching the protective guard to the attachment element;
wherein the latching device has at least one latching element and at least one latching projection;
wherein the latching element is arranged on the attachment element and the latching projection is arranged on the protective guard or the latching element is arranged on the protective guard and the latching projection is arranged on the attachment element;
wherein the latching element is displaceable between a latched position and a release position;
wherein the latching element is elastically formed and the latching element engages behind the latching projection in the latched position;
wherein the latching projection has a setting face that interacts, during pushing the protective guard in axial direction onto the attachment element, with the latching element so that the latching element is displaced into the release position; and
wherein a return element is axially supported on the attachment element and on the protective guard and the return element biases the protective guard in a direction away from the attachment element.

13. The protective arrangement of claim 12, wherein the attachment element has a support collar, the protective guard is radially supported on the support collar.

14. The protective arrangement of claim 13, wherein in the latched position of the latching element, the smallest distance of the latching element to the support collar is smaller than the largest distance of the latching projection to the support collar.

15. The protective arrangement of claim 13, wherein the protective guard is arranged externally around the support collar.

16. The protective arrangement of claim 12, wherein the setting face extends in an axial direction with increasing distance to the support collar and the latching projection has a latching face, on which the latching element is axially supported in the latched position.

17. The protective arrangement of claim 12, wherein the latching element is formed as a spring element.

18. The protective arrangement of claim 12, wherein the latching element has engagement faces for a tool.

19. The protective arrangement of claim 12, wherein the latching projection extends at least partially along the circumference of the protective guard.

20. A protective arrangement, comprising:
- a housing with a shaft journal projecting from the housing;
- a universal shaft connected to the shaft journal;
- an attachment element positioned around the shaft journal and being attached to the housing;
- a tubular protective guard extending along a longitudinal axis, the tubular protective guard positioned around the universal shaft; and
- a latching device attaching the protective guard to the attachment element;
- wherein the latching device has at least one latching element and at least one latching projection;
- wherein the latching element is arranged on the attachment element and the latching projection is arranged on the protective guard or the latching element is arranged on the protective guard and the latching projection is arranged on the attachment element;
- wherein the latching element is displaceable between a latched position and a release position;
- wherein the latching element is elastically formed and the latching element engages behind the latching projection in the latched position;
- wherein the latching projection has a setting face that interacts, during pushing the protective guard in axial direction onto the attachment element, with the latching element so that the latching element is displaced into the release position; and
- wherein a return element is axially supported on the attachment element and on the protective guard and the return element biases the protective guard in a direction away from the attachment element.

* * * * *

UNITED STATES PATENT AND TRADEMARK OFFICE
CERTIFICATE OF CORRECTION

PATENT NO. : 10,309,466 B2
APPLICATION NO. : 15/428454
DATED : June 4, 2019
INVENTOR(S) : Matthias Littau et al.

Page 1 of 1

It is certified that error appears in the above-identified patent and that said Letters Patent is hereby corrected as shown below:

In the Claims

Column 8, in Line 42, replace "guard in axial" with -- guard in an axial --.

Column 10, in Line 11, replace "guard in axial" with -- guard in an axial --.

Signed and Sealed this
Thirtieth Day of July, 2019

Andrei Iancu
*Director of the United States Patent and Trademark Office*